United States Patent
Lee-Hoff et al.

(10) Patent No.: US 11,108,344 B2
(45) Date of Patent: Aug. 31, 2021

(54) SOFT STARTER, OPERATING METHOD, AND SWITCHING SYSTEM

(71) Applicant: Siemens Aktiengesellschaft, München (DE)

(72) Inventors: Kyoung-Jin Lee-Hoff, Amberg (DE); Johann Seitz, Amberg (DE); Klaus Aufschneider, Illschwang (DE); Dirk Hertz, Fichtenhof (DE); Markus Meier, Rieden (DE); Stefan Zitzler, Schwandorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 286 days.

(21) Appl. No.: 16/323,099

(22) PCT Filed: Aug. 3, 2017

(86) PCT No.: PCT/EP2017/069678
§ 371 (c)(1),
(2) Date: Feb. 4, 2019

(87) PCT Pub. No.: WO2018/024832
PCT Pub. Date: Feb. 8, 2018

(65) Prior Publication Data
US 2019/0190407 A1   Jun. 20, 2019

(30) Foreign Application Priority Data
Aug. 4, 2016   (DE) .......................... 102016214419.7

(51) Int. Cl.
*H02H 9/00* (2006.01)
*H02P 1/28* (2006.01)
(Continued)

(52) U.S. Cl.
CPC .................. *H02P 1/28* (2013.01); *H02P 1/22* (2013.01); *H02P 3/18* (2013.01); *H02M 5/293* (2013.01)

(58) Field of Classification Search
CPC ........... H02P 1/28; H02P 23/14; H02H 9/002; H02M 5/293
See application file for complete search history.

(56) References Cited

U.S. PATENT DOCUMENTS

| | | |
|---|---|---|
| 4,996,469 A | 2/1991 | DeLange et al. |
| 5,187,419 A | 2/1993 | DeLange |
| (Continued) | | |

FOREIGN PATENT DOCUMENTS

| | | |
|---|---|---|
| DE | 69223677 | 7/1998 |
| DE | 10200091 | 7/2003 |
| (Continued) | | |

OTHER PUBLICATIONS

DE Office Action 05192017, German Office Action cited in the corresponding German Application No. 102016214419.7; dated May 19, 2017; 5 pp.
(Continued)

*Primary Examiner* — Cortez M Cook
(74) *Attorney, Agent, or Firm* — Lempia Summerfield Katz LLC (57) ABSTRACT

The invention relates to a soft starter (10) for connecting at least one main circuit (12, 14, 16), each of which includes a bypass circuit (20) having a semiconductor switch (22). Said soft starter (10) comprises a control unit (40) for actuating the bypass circuit (20), and the control unit (40) is equipped with a control signal input (44). According to the invention, the control unit (40) has a separate safety signal input (42).

14 Claims, 5 Drawing Sheets

(51) Int. Cl.
*H02P 3/18* (2006.01)
*H02P 1/22* (2006.01)
*H02M 5/293* (2006.01)

(56) References Cited

U.S. PATENT DOCUMENTS

| | | | |
|---|---|---|---|
| 2002/0093774 A1* | 7/2002 | Chung | H02P 25/04 361/2 |
| 2015/0171625 A1* | 6/2015 | Ried | H02H 9/002 318/430 |
| 2015/0180377 A1* | 6/2015 | Hua | H02P 23/14 318/778 |
| 2015/0300305 A1 | 10/2015 | Hertz et al. | |

FOREIGN PATENT DOCUMENTS

| | | |
|---|---|---|
| DE | 102008062851 | 4/2010 |
| DE | 102012214814 | 2/2014 |
| DE | 102012215329 | 3/2014 |
| DE | 102014223856 | 5/2016 |

OTHER PUBLICATIONS

PCT International Search Report and Written Opinion of International Searching Authority dated Oct. 17, 2017 corresponding to PCT International Application No. PCT/EP2017/069678 filed Aug. 3, 2017; 16 pp.

SIRIUS 3RW44, Sanftstarter, Gerätehandbuch, Ausgabe Oct. 2010, Industrielle Schalttechnik, GWA 4NEB 535 2195-01 DS 06, Siemens AG; 2010; 262 pp.

\* cited by examiner

SOFT STARTER, OPERATING METHOD, AND SWITCHING SYSTEM

This application is the National Stage of International Application No. PCT/EP2017/069678, filed Aug. 3, 2017, which claims the benefit of German Patent Application No. 10 2016 214 419.7, filed Aug. 4, 2016. The entire contents of these documents are hereby incorporated herein by reference.

BACKGROUND

The present embodiments relates to a soft starter and an associated operating method for operating an electric motor. The present embodiments also relates to firmware embodied to implement the operating method in a suitable soft starter. The present embodiments further relate to a switching system based on a corresponding soft starter.

The manual "Soft Starter 3RW44—Manual Issue October 2010" with the order designation GWA 4NEB 535 2195-01 DS 06 from Siemens AG discloses a soft starter for operating an electric motor. The soft starter includes in each main circuit a bypass circuit consisting of an electromechanical switch and parallel semiconductor switch that may be actuated via a control unit. Such soft starters may be combined with contactors to ensure safe operation of the electric motor. A combination of the soft starter with a contactor forms a switching system and is able to provide a safety integrity level of SIL 2. A combination of the soft starter with two contactors achieves a safety integrity level of SIL3.

SUMMARY AND DESCRIPTION

The scope of the present invention is defined solely by the appended claims and is not affected to any degree by the statements within this summary.

Automation technology requires switching systems that offer a high degree of safety and compactness. It is also desirable to reduce the number of components and parts in order to achieve a high level of economic efficiency.

The present embodiments may obviate one or more of the drawbacks or limitations in the related art. For example, a soft starter and a corresponding switching system that improve known soft starters and switching systems with respect to the above-described aspects are provided.

In the present embodiments, a soft starter is connected to at least one main circuit via which an electric motor is supplied with power. The soft starter is embodied to interrupt and close the power supply in order to allow operation of the electric motor in the intended manner. A bypass circuit including a semiconductor switch is arranged in the main circuit or circuits in each case. An electromagnetic switch (e.g., a relay) may be attached parallel to the semiconductor switch to permit virtually wear-free continuous operation in the closed state. The semiconductor switch is, for example, embodied as antiparallel thyristors capable of enabling arc-free switching and realize leading-edge phase control or trailing-edge phase control. The leading-edge phase control or trailing-edge phase control may, for example, be used to provide a controlled ramp-down function of the electric motor. For the operation of the at least one bypass circuit, the soft starter is provided with a control unit, which is embodied to issue actuation commands and/or ignition commands to the electromechanical switch and the semiconductor switch. The control unit is equipped with a control signal input via which an operation control signal may be received. Herein, an operation control signal is a control signal that is generated by a user or a higher-ranking control instance (e.g., a stored program control (SPC)) in order to initiate or execute a desired operation of the electric motor. According to the present embodiments, the control unit also includes a separate safety-signal input via which safety signals may be received. Herein, the safety signals may originate from a safety-oriented circuit or control (e.g., from a safety-oriented signaling device, such as an emergency off or emergency stop switch, a position switch, a protective door, a light barrier, a light array, or a light curtain).

A system is safety-oriented if, on the occurrence of a failure (e.g., termination of the ability of the system to perform a required function), the system changes to a defined safe system state. Safety-oriented is also referred to as "fail safe".

The safety-signal input for receiving safety signals according to the present embodiments is a safety-oriented input of the control unit. The control unit carries out internal tests in order to detect errors at the safety-signal input. This provides that a safety signal indicating the presence of a hazardous situation that arrives at the safety-signal input is received correctly by the control unit. The control unit may apply test patterns (e.g., bit pattern tests, such as light and/or dark tests) to the safety-signal input and read the test patterns back via outputs. The values obtained in this way are compared to a setpoint, thus enabling errors at the safety-signal input to be detected.

Although control signal inputs for receiving operation control signals may, to a certain extent, also be subject to error detection and error avoidance measures, these are generally not sufficient to ensure safe shutdown of the system under all circumstances. In contrast to a "simple" control signal input for receiving operation control signals, the term "safety-signal input for receiving safety signals" in the present embodiments refers to a signal input with a safety function that meets at least category 2 of ISO 13849-1 or comparable safety requirements.

Thus, with the operation control signal indicating a user's intention and the safety signal indicating the existence of a hazardous situation, the soft starter according to the present embodiments is able to take account of two operationally-relevant items of information separately. The soft starter according to the present embodiments has a high degree of safety and, in direct connection with the electric motor, achieves a safety integrity level of SIL 2 according to the standard IEC 61508. Thus, the combination of a soft starter with an additional contactor previously necessary to achieve SIL 2 is unnecessary. Hence, the soft starter according to the present embodiments achieves at least the same level of safety with a reduced number of components and parts.

In one embodiment of the soft starter, the safety-signal input is subjected to a light test and/or a dark test. Herein, test patterns (e.g., bit pattern tests) may be applied to the safety-signal input and read back via outputs. The values obtained in this way are compared with a setpoint, thus enabling errors to be detected. Herein, the embodiment of such a safety-signal input is dependent on the desired safety level for the assembly.

In one embodiment of the soft starter, the safety signals that reach the safety-signal input are sent from a signal output, which is subjected to a light test or a dark test. The safety-signal input may receive safety signals from a failsafe output module (e.g., a digital output module). Such failsafe output circuits are, for example, used as failsafe peripheral assemblies in industrial automation technology (e.g., process automation). With such failsafe peripheral assemblies, process values may only be output if the output is error-free.

The outputs are usually tested. Herein, test patterns (e.g., bit pattern tests) are applied and read back via inputs. The values obtained in this way are compared to a setpoint, thus enabling errors to be detected. Herein, the embodiment of such an output is dependent upon the desired safety level for the assembly.

In one embodiment, a safety signal differs from a "normal" operation control signal in that the safety signal is sent by a safety-oriented circuit or control. A safety-oriented circuit or control is established as inherently error-proof by measures such as redundant signal-processing channels, regular self-tests, and the like.

In one embodiment of the soft starter, the safety-signal input provided for the reception of safety signals is a failsafe input module (e.g., a digital input module). One example of such a safety-signal input is a failsafe digital input (F-DI) module of the SIMATIC control system from Siemens AG. The digital input module F-DI receives, for example, safety signals from a digital output circuit, a failsafe digital output (F-DO) module of the SIMATIC control system from Siemens AG. Herein, the F-DO output module carries out a bit pattern test at defined times (e.g., every 15 minutes). Herein, the assembly applies several bit patterns at outputs of the assembly in order to detect errors (e.g., a short circuit, short to ground, or ground fault). The bit pattern test may include a dark test and/or a light test. Parallel thereto, the F-DI input module carries out a bit pattern test at defined times (e.g., every 15 minutes). Herein, the assembly applies several bit patterns to inputs of the assembly in order to detect errors (e.g., a short circuit, short to ground, or ground fault). The bit pattern test may include a dark test and/or a light test.

In one embodiment of the soft starter, the control unit is embodied to acquire and check the safety signal from the safety-signal input and the operation control signal from the control signal input. The safety signal and the operation control signal may each only adopt two states. In one of the states, an operation of the connected electric motor is commanded and, in the other state, an operation stop of the electric motor is commanded. The control unit is able to detect the content of the safety signal and the operation control signal. If it is detected that the safety signal and/or the operation control signal are commanding an operation stop of the electric motor, the control unit is configured to react thereto by interrupting the at least one main circuit. The interruption is performed by issuing a corresponding deactivation command. For example, interrupting the main circuit achieves a stop of the electric motor of the type "safe torque off", STO for short. Alternatively, the deactivation command initiates a ramp down sequence. The detection of the safety signal and the operation control signal integrates a safety-oriented function in the soft starter according to the present embodiments in a simple way. This design permits a high degree of modularity so that the soft starter may readily be used as a replacement part when retrofitting an existing switching system.

The control unit in the soft starter according to the present embodiments may include at least one measuring signal input for each main circuit via which signals are transported from a measuring instrument to the control unit. Herein, the measuring instrument is arranged on a component of the bypass circuit and supplies at least one operating variable of the bypass circuit. An operating variable of the bypass circuit may, for example, be a current flow in one of the main circuits, a voltage that, in the open state, is applied to the bypass circuit, an actuation signal of the semiconductor switch (e.g., an ignition command), and/or an activity signal of a drive of the electromechanical switch. A measuring instrument of this type enables the direct detection of the operating state of the bypass circuit. This provides monitoring as to whether the operating state specified by the control unit is actually achieved and, if applicable, a diagnosis of the fault. Overall, this increases the possible functional scope of the soft starter according to the present embodiments.

In a further embodiment, the control unit is connected to a feedback unit, which is embodied to issue a feedback signal to components outside the soft starter. Herein, the feedback signal may be binary and corresponds to the switching state present in the respective bypass circuit. The control unit is able to determine the operating state of the semiconductor switch from the present signals (e.g., the operation control signal, the safety signal, at least one operating variable, and/or a combination of operating variables) and issue the operating state as a binary signal to the feedback unit. For example, a current present in a main circuit indicates a closed state of the bypass circuit. A voltage present across the bypass circuit indicates an open state of the bypass circuit. In addition, an activity signal of the drive of the electromagnetic switch indicates a desired continuous operation of the bypass circuit. Such an activity signal is, for example, the power supply for a coil. The presence of an actuation signal of the semiconductor switch (e.g., an ignition command to a thyristor) indicates a desired leading-edge-phase mode of the bypass circuit. A combination of several of these operating variables enables the operating state of the respective bypass circuit to be determined with a high degree of reliability. In this way, a corresponding feedback signal forms in an abstract manner the function of a positively driven signaling contact in a contactor and has the same functional scope of such a contact. This also includes reporting errors detected by cyclic tests. This provides that the soft starter according to the present embodiments may be readily integrated into existing switching systems and coupled to a higher-ranking control instance, such as a stored program control, without modifications. The soft starter offers a wide range of functions with reduced hardware outlay and may be produced in a compact and economic manner.

The feedback unit may be embodied as a relay, which includes positively coupled switching contacts and is connected to two circuits. Thus, depending upon the state signaled by the feedback signal, a corresponding signal occurs in the two connected circuits. Herein, at least one of the circuits of the relay is connected to the control unit. Consequently, a mirror signal corresponding to the feedback signal is generated in the relay and fed back to the control unit. The control unit is able to check the mirror signal for consistency or discrepancy with respect to the self-determined operating state. As a result, the control unit is able to check the operating state of the at least one bypass circuit of the soft starter signaled to external components for correctness. This enables actuation errors by a higher-ranking control instance or a user to be avoided in a switching system in which the soft starter according to the present embodiments is used. Overall, the achievable degree of safety is further increased by the soft starter according to the present embodiments.

In one embodiment of the soft starter, a supplementary semiconductor switch is arranged in series with the respective bypass circuit in the at least one main circuit. Alternatively or additionally, a supplementary electromechanical switch may also be arranged in series with the respective bypass circuit in the at least one main circuit. This gives rise to a hardware redundancy that endows the soft starter according to the present embodiments with an increased degree of failure safety. For example, this enables a failure of the semiconductor switch or the electromechanical switch in the bypass circuit to be compensated. The soft starter of the present embodiments has a compact design and therefore offers sufficient installation space for supplementary hardware components, such as electromechanical switches and semiconductor switches, thus enabling a still higher degree of safety to be achieved with the same space requirements.

The soft starter may also be equipped with an integrated evaluation switching device. The solution according to the present embodiments saves space, and thus, it is readily possible to integrate an evaluation switching device.

As another example, an operating method for an electric motor that is actuated by a soft starter is provided. The soft starter includes a control unit with which a bypass circuit may be actuated and which is arranged in at least one main circuit. Herein, the at least one main circuit supplies the electric motor with energy. The bypass circuit includes a semiconductor switch to which an electromechanical switch may be arranged in parallel. The method according to the present embodiments is configured for safe operation of the electric motor via the soft starter and includes a first method act entailing continuous operation of the electric motor. With a soft starter with an electromechanical switch in the bypass circuit, in continuous operation, the electromechanical switch in the at least one main circuit is closed and the parallel semiconductor switch is open. In a further method act, an operation control signal specifying either an operation or operation stop of the electric motor is received via a control signal input of the control unit. In a further method act that takes place sequentially or parallel to the reception of the operation control signal, a safety signal is received via a separate safety-signal input of the control unit. The safety signal is also embodied to specify either the operation of the electric motor or an operation stop of the electric motor. Herein, the safety signal is generated by a safety-oriented signaling device, such as, for example, an emergency off switch, a light barrier, a safety switching device, or a failsafe SPC (F-SPC).

In a further method act, the operation control signal and the safety signal are detected and checked. The continuous operation of the electric motor is maintained as long as the operation control signal and the safety signal simultaneously command an electric motor command. In a subsequent method act, a deactivation command is issued to the bypass control if the safety signal and/or the operation control signal command an operation stop. Herein, the deactivation command may include a command to switch off the electromechanical switch and/or a corresponding sequence of commands to the semiconductor switch. Additionally or alternatively, the deactivation command to the bypass circuit may also include the suppression of ignition commands to the semiconductor switch or command a controlled ramp-down sequence.

Hence, in addition to the operation control signal, the method according to the present embodiments also includes the simultaneous provision of a safety signal and direct evaluation of the safety signal in the control unit thereof. A high degree of functional integration is achieved, and the safety integrity level SIL 2 according to IEC 61508 is reached. It is possible to dispense with a supplementary contactor in order to achieve safety integrity level SIL 2. The operating method of the present embodiments is simple and economic to implement in soft starters.

In one embodiment of the operating method, in a subsequent method act, an activation command is issued to the bypass circuit so that the electric motor is put back into operation. The activation command is issued by the control unit if an operation command of the electric motor is received in each case simultaneously as a safety signal and as an operation control signal. The activation command may be issued by the control unit if the transition of the operation control signal from a stop command to an operation command is detected. This, for example, prevents the electric motor from being deactivated via an emergency off switch or a light barrier and then followed by an uncontrolled restart when the emergency off switch or the light barrier is reset. Switching the operation control signal from a stop command to an operation command represents a selective control intervention performed by the user or the higher-ranking control instance, and thus, this also provides a high degree of safety.

In one embodiment of the operating method, the at least one operating variable is a current flow in one of the main circuits, a voltage through the bypass circuit, an actuation signal of the semiconductor switch, an activity signal of a drive of the electromechanical switch, and/or an ignition signal to the semiconductor switch.

In addition, in the operating method, it is possible to determine a feedback signal representing the operating state of the bypass circuit based on the at least one operating variable or a combination of operating variables of the bypass circuit. The feedback signal is forwarded via a feedback unit to components outside the soft starter. It is further possible for a mirror signal that corresponds with the feedback signal to be generated in the feedback unit. The mirror signal is fed back to the control unit so that it is possible to monitor the externally signaled state of the at least one bypass circuit. This further increases the degree of safety achieved.

In yet another example, a switching system that is embodied to switch at least one main circuit via which an electric motor is supplied with energy is provided. The switching system includes a safety switching device that interacts with an electromechanical switching device (e.g., a contactor). The electromechanical switching device is connected to the at least one main circuit connected in series with a soft starter according to one of the above-described embodiments. The electromechanical switching device achieves a hardware fault tolerance of 1 in the switching system according to the present embodiments, thus providing a safety integrity level of SIL 3. A second electromechanical switching device as previously required in the prior art for SIL 3 may be dispensed with in the switching system according to the present embodiments. As a result, the switching system of the present embodiments offers an increased degree of safety with a lower number of parts and a reduced installation space. The simplicity and compactness of the switching system according to the present embodiments permit simple and economic production. In addition, a command output of the safety switching device may be connected to an operation control instrument with which the operation control signal is generated. Thus, an activation or deactivation command from the safety switching device reaches the soft starter according to the present embodiments via the operation control instrument at the control signal input. Similarly, the command output of the safety switching device is directly connected to the safety input of the soft starter. In addition, a second command output of the safety switching device may be directly connected to the electromechanical switching device. This achieves a redundant circuit for the at least one main circuit.

The redundancy and diversity achieved in this way provides a safety integrity level of SIL 3.

In another example, a program embodied to be stored and executed in a control unit with a memory and a computing unit is provided. The program includes instructions and may be stored in a non-transitory computer-readable storage medium. According to the present embodiments, the program is embodied to carry out the operating method in at least one of the above-described embodiments at a soft starter. The solution according to the present embodiments may be implemented by programming, and thus, a functional expansion of the operating method is subject to only minimal hardware limitations. As a result, the solution according to the present embodiments is versatile and expandable.

DETAILED DESCRIPTION

Figure 1:
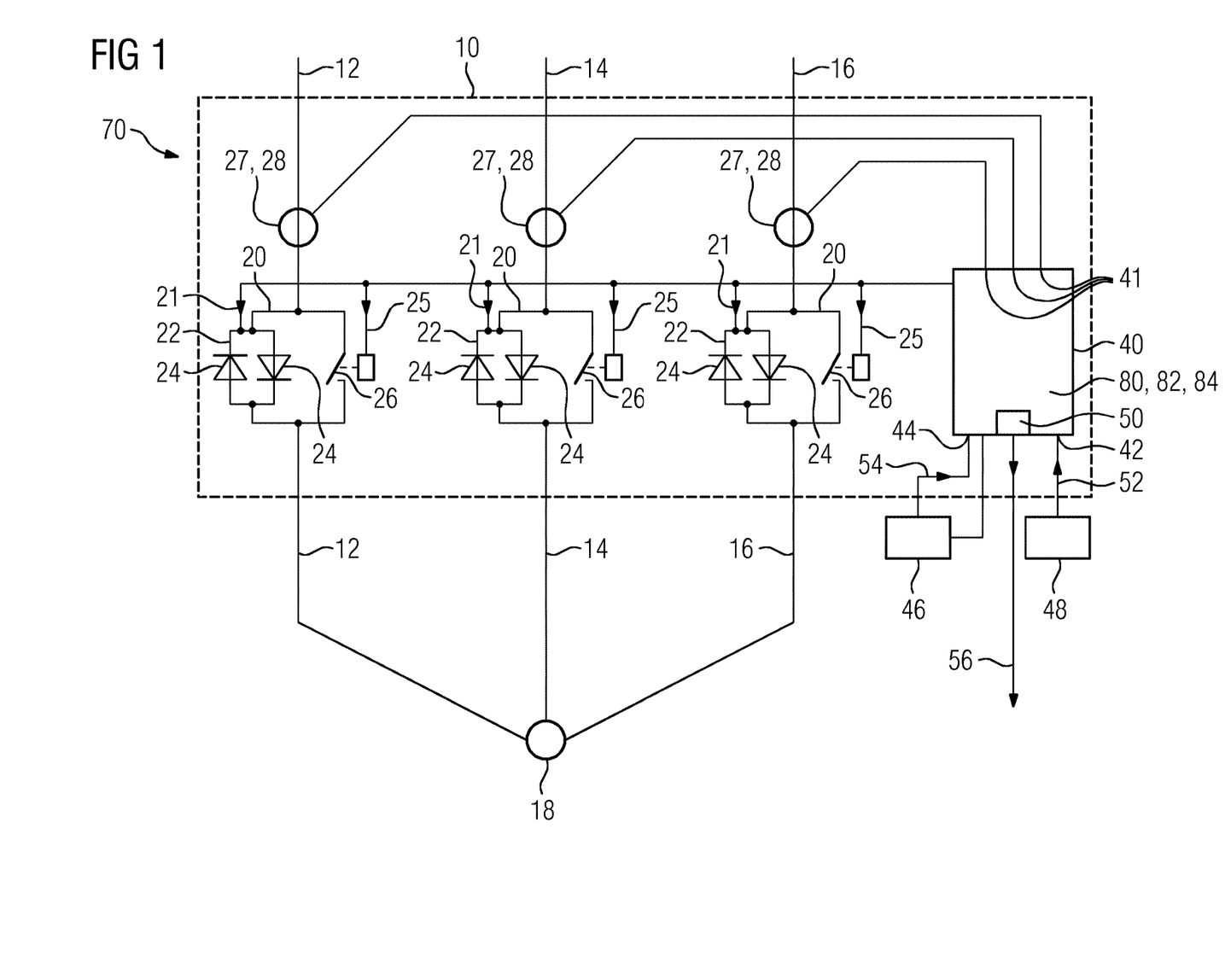
FIG. 1 shows a first embodiment of a switching system with a soft starter.

FIG. 1 depicts a first embodiment of a switching system 70 with a soft starter 10. The soft starter 10 is connected to three main circuits 12, 14, 16 of a three-phase power supply of an electric motor 18. In the soft starter 10, each of the main circuits 12, 14, 16 is assigned a bypass circuit 20. Each of the bypass circuits 20 includes a semiconductor switch 22 and an electromechanical switch 26. In the embodiment shown in FIG. 1, the semiconductor switch 22 is embodied as a pair of thyristors 24 in an antiparallel arrangement. In FIG. 1, the electromechanical switches 26 are embodied as relays. Each of the semiconductor switches 22 and the electromechanical switches 26 is connected to a control unit 40 (e.g., a controller) that controls the soft starter 10 during operation. The control unit 40 is embodied to send ignition commands 21 to the semiconductor switches 22 and actuation commands 25 to the electromechanical switches 26. The ignition commands 21 and the actuation commands 25 in each case cause the semiconductor switches 22 and the electromechanical switches 26 to open and close. In continuous operation of the electric motor 18, the electromechanical switches 26 are closed and the semiconductor switches 22 are open. The semiconductor switches 22 serve to control a defined ramp-up sequence and ramp-down sequence of the electric motor 18. In the control unit 40, a program 80 is stored in a memory 82 and may be executed by a computing unit 84. The program 80 is embodied to, for example, implement a leading-edge phase control or a trailing-edge phase control using the semiconductor switches 22.

Each main circuit 12, 14, 16 is assigned a measuring instrument 27 embodied as a measuring transducer 28 that is embodied to detect and/or measure a current flow in one of the main circuits 12, 14, 16. Each of the measuring instruments 27 is coupled to the control unit 40 via a measuring signal input 41. The program 80 in the control unit 40 is embodied to receive and evaluate an operating variable detected by the measuring instruments 27 (e.g., the current flow in the main circuits 12, 14, 16).

In addition, the control unit 40 is provided with a control signal input 44, via which operation control signals 54 are received. The operation control signals 54 are generated by an operation control instrument 46 located outside the soft starter 10. The operation control signals 54 control the electric motor 18 in the context of a planned operating sequence (e.g., a programming sequence or a deliberate user intervention). According to the present embodiments, the control unit 40 is equipped with a separate safety-signal input 42 via which a safety signal 52 is received. The safety signals 52 are generated by a safety-oriented signaling device 48 (e.g., an emergency off switch or a light barrier). According to an embodiment, the soft starter 10 is embodied to check the operation control signal 54 and the safety signal 52 during operation as to whether at least one of the signals 52, 54 specifies an operation stop of the electric motor 18. The control unit 40 is further embodied to detect the present state of the bypass circuits 20 taking into account the data received via the measuring signal inputs 41. The feedback unit 50 may generate a feedback signal 56 depicting the switching state of at least one bypass circuit. The feedback signal 56 is sent outside thus enabling further components of an automation system, which is not shown in further detail, to receive this information. In the feedback unit 50, the feedback signal 56 is used as the basis for the generation of a corresponding mirror signal 58. The mirror signal 58 may be evaluated by the control unit 40. This enables a consistency, or possibly a discrepancy, between the present operating state of the corresponding bypass circuit 20 and the operating state depicted in the feedback signal 56 to be detected.

Figure 2:
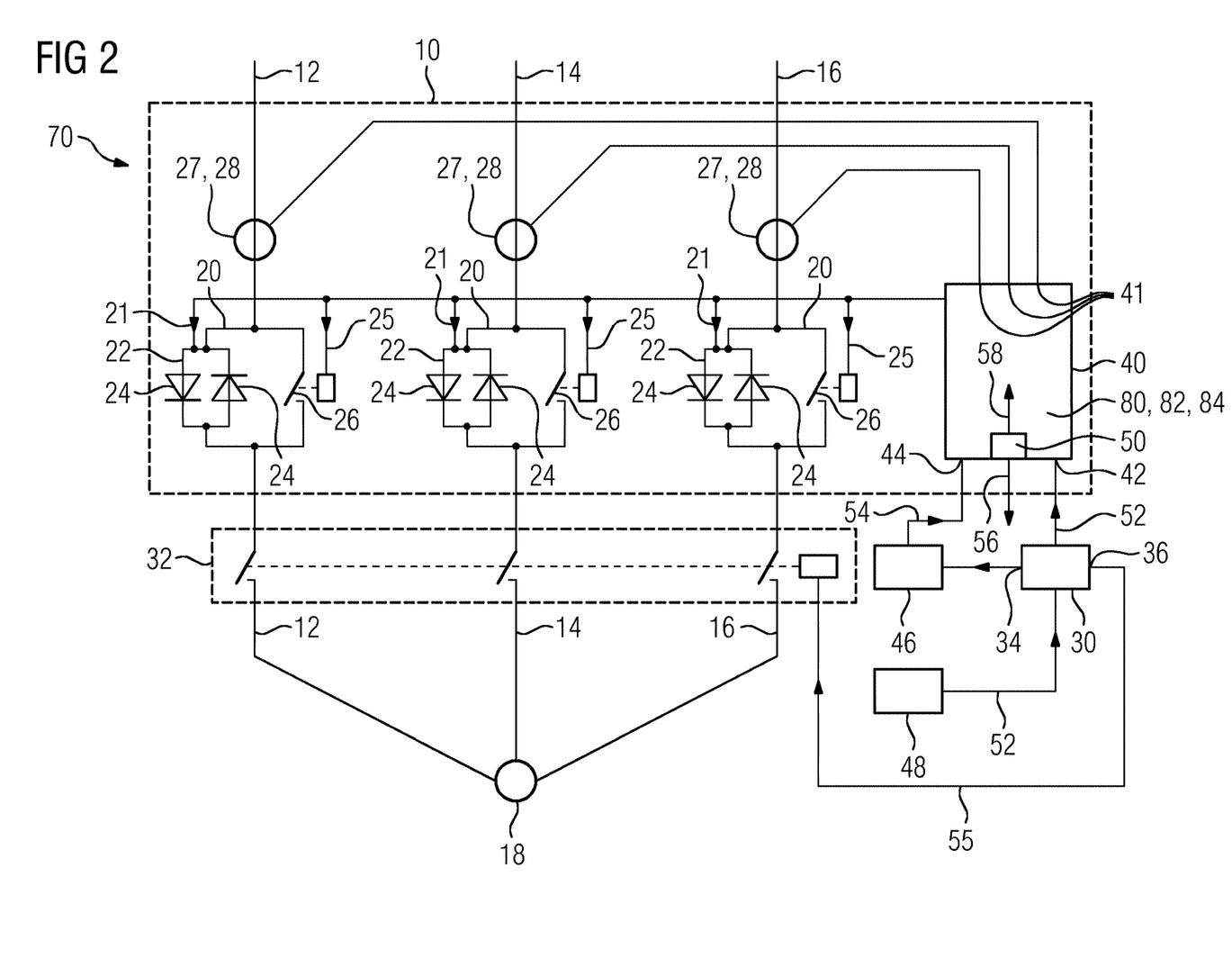
FIG. 2 shows a second embodiment of the switching system with a soft starter and an electromechanical switching device.

FIG. 2 depicts a second embodiment of a switching system 70 with a soft starter 10. The soft starter 10 is connected to three main circuits 12, 14, 16 of a three-phase power supply of an electric motor 18. In the soft starter 10, each of the main circuits 12, 14, 16 is assigned a bypass circuit 20, which in each case includes a semiconductor switch 22 and an electromechanical switch 26. In the embodiment shown in FIG. 2, the semiconductor switch 22 is embodied as a pair of thyristors 24 in an antiparallel arrangement. In FIG. 2, the electromechanical switches 26 are embodied as relays. Each of the semiconductor switches 22 and the electromechanical switches 26 is connected to a control unit 40 (e.g., a controller) that controls the soft starter 10 during operation. The control unit 40 is embodied to send ignition commands 21 to the semiconductor switches 22 and actuation commands 25 to the electromechanical switches 26. The ignition commands 21 and the actuation commands 25 in each case cause the semiconductor switches 22 and the electromechanical switches 26 to open and close. In continuous operation of the electric motor 18, the electromechanical switches 26 are closed and the semiconductor switches 22 are open. The semiconductor switches 22 serve to control a defined ramp-up sequence and ramp-down sequence of the electric motor 18. In the control unit 40, a program 80 is stored in a memory 82 and may be executed by a computing unit 84. The program 80 is embodied to, for example, implement a leading-edge phase control or a trailing-edge phase control by the semiconductor switches 22.

Each main circuit 12, 14, 16 is assigned a measuring instrument 27 embodied as a measuring transducer 28 that is embodied to detect and/or measure a current flow in one of the main circuits 12, 14, 16. Each of the measuring instruments 27 is coupled to the control unit 40 via a measuring signal input 41. The program 80 in the control unit 40 is embodied to receive and evaluate an operating variable detected by the measuring instruments 27 (e.g., the current flow in the main circuits 12, 14, 16).

In addition, the control unit 40 is provided with a control signal input 44 via which the operation control signals 54 are received. The operation control signals 54 are generated by an operation control instrument 46 located outside the soft starter 10. The operation control signals 54 control the electric motor 18 in the context of a planned operating sequence (e.g., a programming sequence or a deliberate user intervention). The operation control instrument 46 may be actuated via a safety switching device 30 via a first command output 34. The safety switching device 30 is further embodied to receive a safety signal 52 generated by a safety-oriented signaling device 48 (e.g., an emergency off switch or a light barrier). The safety signal 52 is sent by the safety switching device 30 to the control unit 40 via a safety-signal input 42. The safety switching device 30 has a second command output 36 via which an electromechanical switching device 32, which in FIG. 2 is embodied as a contactor, is actuated. A switching command 55 to open or close the electromechanical switching device 32 is issued via the second command output 36 if the safety switching device 30 receives a corresponding command via the safety-oriented signaling device 48 and/or the operation control instrument 46. For the intended purpose, the switching command 55 is congruent with the ignition commands 21 and actuation commands 25 in the bypass circuits 20. The electromechanical switching device 32 causes the switching system 70 depicted in FIG. 2 to achieve a hardware tolerance of at least one. As a result, the switching system 70 according to FIG. 2 achieves safety integrity level SIL 3.

According to the present embodiments, the soft starter 10 is embodied to check the operation control signal 54 and the safety signal 52 during operation as to whether at least one of the signals specifies an operation stop of the electric motor 18. The control unit 40 is further embodied to detect the present state of the bypass circuit 20 taking into account the data received via the measuring signal inputs 41. The feedback unit 50 may generate a feedback signal 56 depicting the switching state of at least one bypass circuit. The feedback signal 56 is sent outside thus enabling further components of an automation system, which is not shown in further detail, to receive this information. In the feedback unit 50, the feedback signal 56 is used as the basis for the generation of a corresponding mirror signal 58. The mirror signal 58 may be evaluated by the control unit 40. This enables a consistency, or possibly a discrepancy, between the present operating state of the corresponding bypass circuit 20 and the operating state depicted in the feedback signal 56 to be detected.

Figure 3:
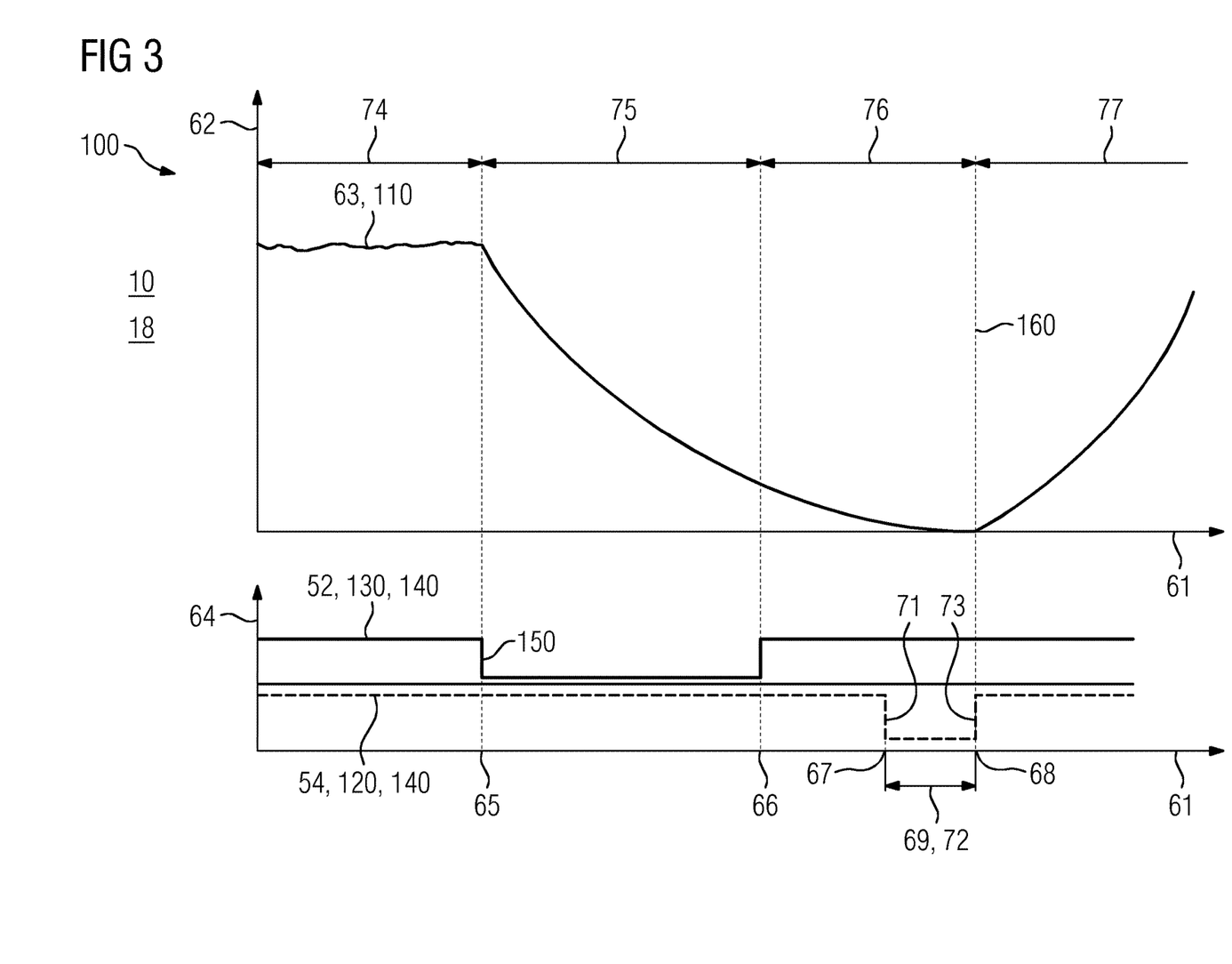
FIG. 3 shows a time-value diagram of a first embodiment of an operating method.

FIG. 3 shows a time-value diagram of a first embodiment of the operating method 100 for an electric motor 18 with a soft starter 10. In the upper part of FIG. 3, the horizontal axis forms the time axis 61 and the vertical axis forms the value axis 62 by which the course of a rotational speed 63 is depicted. In the lower part of FIG. 3, the vertical axis is a state axis 64 depicting the content of signals 52, 54. The time axis 61 is the same in the lower part of FIG. 3 as in the upper part. According to FIG. 3, in the method 100, a first method act 110 initially contains a continuous operation phase 74 of the electric motor 18. In the continuous operation phase 74, the safety signal 52 and the operation control signal 54 have a high state, which in FIG. 3 depicts an operation command for the electric motor 18. During the continuous operation phase 74, a second method act 120 and a third method act 130 run in parallel. In the second method act 120, the operation control signal 54 is received, and in the third method act 130, the safety signal 52 is received. In a fourth method act 140, which also runs in parallel, the safety signal 52 and the operation control signal 54 are detected and checked as to whether at least one of these signals 52, 54 commands an operation stop of the electric motor 18.

The continuous operation phase 74 finishes with a safety release 65 in which the safety signal 52 assumes a low state. In the embodiment shown in FIG. 3, the low state represents a stop command for the electric motor 18. Then, in a fifth method act 150, a control unit 40 sends a corresponding deactivation command to bypass switches 20 of the soft starter 10, which are not shown in further detail. The power supply of the electric motor 18 is thus interrupted. In a subsequent ramp-down phase 75, the rotational speed 63 of the electric motor 18 decreases. In the ramp-down phase 75, the safety signal 52 remains in the low state and the operation control signal 54 remains in the high state. The ramp-down phase 75 ends with a safety reset 66 by which the safety signal 52 assumes a high state once again. This occurs when the event that induced the safety release 65 has disappeared again. In the reactivation phase 76, in which the operation control signal 54 and the safety signal 52 are again in the high state, the rotational speed 63 drops further. During the reactivation phase 76, a control reset 67, in which the operation control signal 54 is controlled in the low state for a reset duration 69, takes place. The reset duration 69 is limited by a falling signal edge 71 and a rising signal edge 73. The end of the temporary low state 72 also forms the end of the reactivation phase 76.

According to FIG. 3, in the method 100, an activation command is only sent in a sixth method act 160 to the at least one bypass circuit 20 of the soft starter 10 if, following the onset of a safety release 65, the operation control signal 54 also has at least one rising signal edge 73. The restart 68 established in this way results in the start of a new ramp-up phase 77 in which the rotational speed 63 of the electric motor 18 increases.

Figure 4:
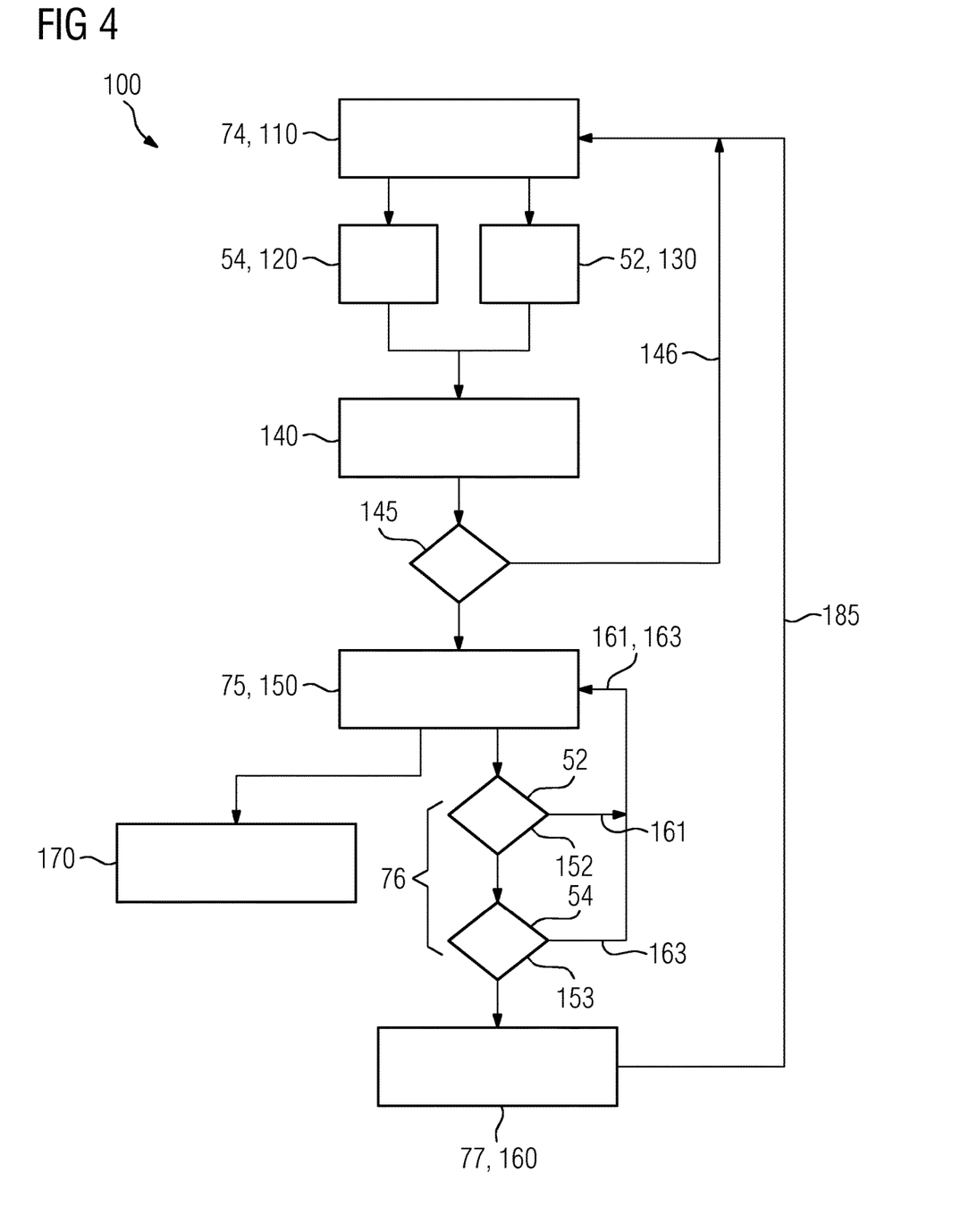
FIG. 4 shows a second embodiment of the operating method.

FIG. 4 is a schematic depiction of a flow chart of a second embodiment of the operating method 100. The operating method 100 starts with a first method act 110 with a continuous operation phase 74. In a second method act and a third method act 130, an operation control signal 54 and a safety signal 52 are received by a control unit 40, which is not shown in further detail, of a soft starter 10. Both these signals 52, 54 are checked in a further, fourth, method act 140 as to whether at least one of the signals 52, 54 commands a deactivation of an electric motor 18 by the soft starter 10. Depending upon the check in the fourth method act 140, the course of the operating method 100 branches into a first branch 145. If the operation control signal 54 and the safety signal 52 command an operation of the electric motor 18, a return 146 to the first method act 110 takes place, and the continuous operation phase 74 is maintained.

However, if in the first branch 145, at least one of the signals 52, 54 commands an operation stop of the electric motor 18, in a fifth method act 150, a deactivation command is sent to at least one bypass circuit 20 and a ramp-down phase 75 is initiated by the interruption of the power supply of the electric motor 18. Proceeding therefrom, if there are no further events in the operating method 100, the electric motor 18 reaches the stable final state 170, in which the rotational speed 63 of the electric motor 18 reaches zero.

During the ramp-down phase 75 initiated by the fifth method act 150, a check is performed in a second branch 152 as to whether the safety signal 52 again commands an operation of the electric motor 18. If the safety signal 52 corresponds to a stop command, a return 161 to the fifth method act 150 takes place. If the safety signal 52 corresponds to an operation command, the operation control signal 54 is checked in a third branch 153. If the operation control signal 54 corresponds to a stop command, a return 163 to the fifth method act 150 takes place. However, if the operation control signal 54 corresponds to an operation command (e.g., due to a rising edge 73) of the operation control signal 54, which is not shown in further detail, a sixth method act 160 follows. The period in which the states of the safety signal 52 and the operation control signal 54 are checked after the fifth method act 150 forms the reactivation phase 76 of the method 100.

In the sixth method act 160, the control unit 40 issues an activation command to the at least one bypass circuit 20, which is not shown in further detail, and thus, the power supply of the electric motor 18 is restored. Following the new ramp-up phase 77, the operating method 100 again achieves a continuous operating state 74 and makes a complete return 185 back to the initial situation, the first method act 110.

Figure 5:
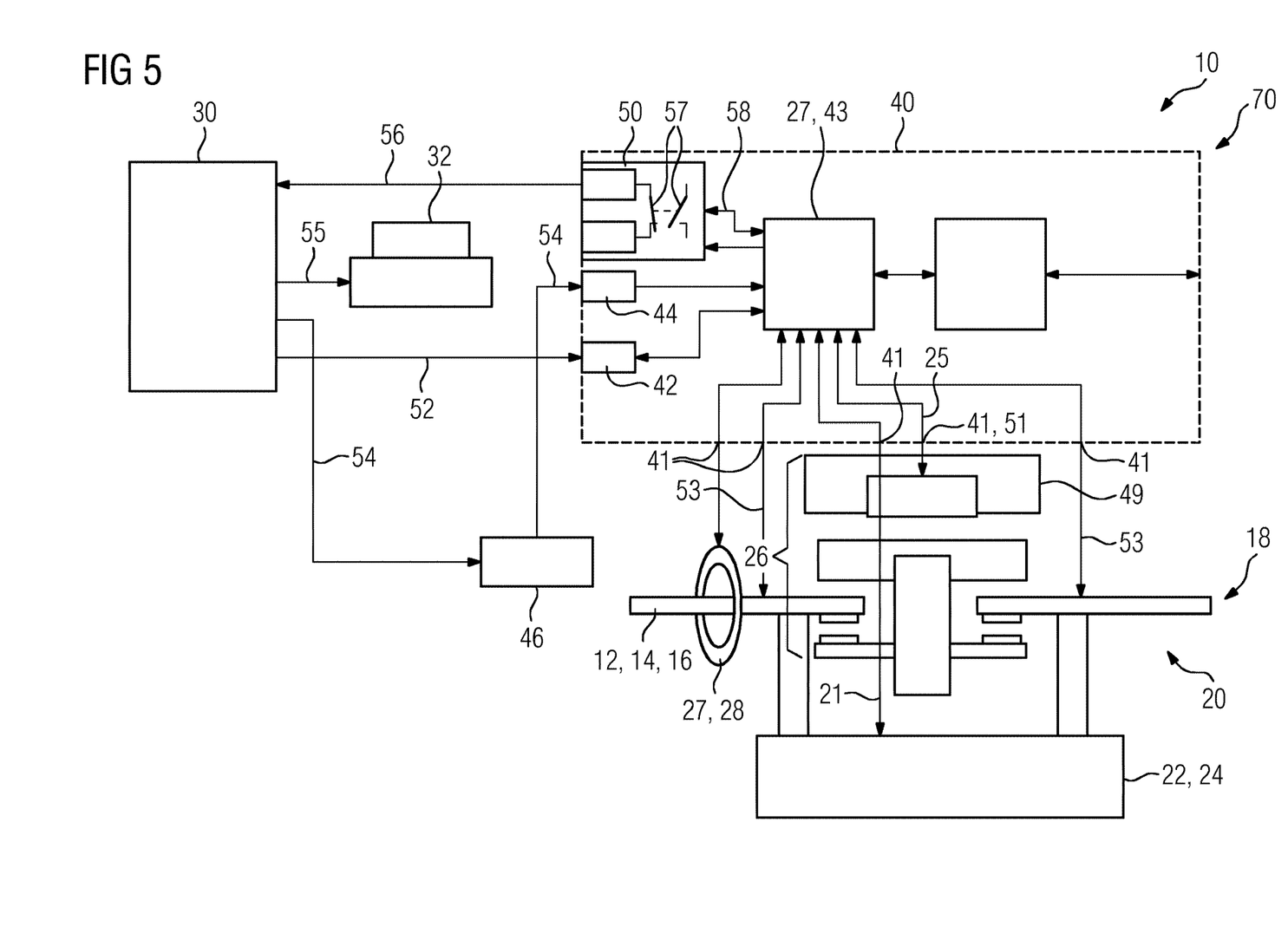
FIG. 5 shows a third embodiment of the switching system with a soft starter.

FIG. 5 shows a section of the design of a third embodiment of the switching system 70 with the soft starter 10. The soft starter 10 includes a bypass circuit 20 including an electromechanical switch 26 and a semiconductor switch 22. The electromechanical switch 26 is embodied as a relay, which is driven via a coil 49. The activation and deactivation of the electromechanical switch 26 takes place via actuation commands 25 via which the current feed to the coil 49 is switched on and off. The semiconductor switch 22 is constructed from thyristors 24 in an antiparallel arrangement, which are not shown in further detail. A control unit 40 of the soft starter 10 is connected to the bypass circuit 20 via several measuring signal inputs 41 and uses the operating variables obtained in this way to obtain information on the state of individual components of the bypass circuit 20. The main circuit 12, 14, 16 to which the bypass circuit 20 is connected is provided with a measuring instrument 27, which is embodied as a measuring transducer 28. A current flow in the main circuit 12, 14, 16 is detected via the measuring transducer 28 and the corresponding measuring signal sent to a processing unit 43 of the control unit 40. Via the measuring transducer 28, it is possible to detect whether an electric motor 18 supplied with power via the main circuit 12, 14, 16 has been deactivated successfully.

The processing unit 43 also includes measuring instruments 27 with which a blocking voltage 53 at the bypass circuit 20 may be detected. In the open state of the electromechanical switch 26 and the semiconductor switch 22, the blocking voltage 53 reaches a maximum. In the closed state of the bypass circuit 20, the measured blocking voltage 53 is substantially zero. Hence, the state of the bypass circuit 20 may also be detected from the blocking voltage 53. The ignition commands 21 sent to the semiconductor switch 22 and actuation commands 25 sent to the electromechanical switch 26 are in each case signaled to the processing unit 43 via measuring signal inputs 41. A coil voltage 51 of the coil 49 may be detected via a measuring signal input 41. The control unit 40 is able to evaluate the information signaled via the measuring signal inputs 41 information in order to determine which state is present in the bypass circuit 20. The combination of a plurality of items of information from different measuring signal inputs 41 provides a redundant detection, thus always enabling safe actuation of the bypass circuit.

The state determined in the control unit 40 based on the operating variables supplied via the measuring signal inputs 41 is signaled to a feedback unit 50 that includes two circuits 57. The feedback unit 50 issues a feedback signal 56 corresponding to the present state of the bypass circuit 20. One of the circuits 57 in the feedback unit 50 generates a mirror signal 58 that, in the intended manner, corresponds to the feedback signal 56. The mirror signal 58 is fed back to the processing unit 43. As a result, the control unit 40 checks the feedback signal 56 sent outside to a safety switching device 30. The processing unit 43 also receives the safety signal 52 via the safety-signal input 42 and an operation control signal 54 via the control signal input 54 from an operation control instrument 46. The operation control instrument 46 interacts with the safety switching device 30 to transmit the operation control signal 54. The safety switching device 30 is turn coupled to an electromechanical switching device 32 that may be brought into an open and closed state by switching commands 55.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A soft starter for connecting at least one main circuit, each main circuit of the at least one main circuit including a bypass circuit having a semiconductor switch, the soft starter comprising:
   a controller configured to actuate the respective bypass circuit, the controller comprising:
      a control signal input configured to receive operation control signals; and
      a separate safety-signal input configured to receive safety signals,
   wherein the controller is configured to check a safety signal from the separate safety-signal input and an operation control signal from the control signal input.

2. The soft starter of claim 1, wherein the controller further comprises at least one measuring signal input for each main circuit of the at least one main circuit, the at least one measuring signal input being coupleable in each case to one measuring instrument for detecting at least one operating variable of the respective bypass circuit.

3. The soft starter of claim 1, wherein the controller is connected to a feedback unit that is configured to output a feedback signal that corresponds to an existing switching state of the respective bypass circuit.

4. The soft starter of claim 3, wherein the feedback unit includes a relay with positively coupled switching contacts, the relay being connected to two circuits, and
   wherein at least one of the two circuits is electrically connected to the controller for transmitting a mirror signal.

5. The soft starter of claim 1, wherein in the at least one main circuit, a supplementary switch is arranged in series with the respective bypass circuit.

6. The soft starter of claim 1, wherein the controller is connected to an evaluation switching device.

7. An operating method for an electric motor by a soft starter, the soft starter comprising controller and being connected to at least one circuit comprising a bypass circuit having a semiconductor switch, the method comprising:
continuously operating the electric motor;
receiving an operation control signal via a control signal input of the controller;
receiving a safety signal via a separate safety input of the controller;
checking the operation control signal and the separate safety signal; and
issuing a deactivation command to the respective bypass circuit when it is detected in the checking that the separate safety signal, the operation control signal, or the separate safety signal and the operation control signal command an operation stop.

8. The operating method of claim 7, further comprising issuing an activation command to the respective bypass circuit when a switch-on command is received as a safety signal and a transition of the operation control signal from a switch-off command to a switch-on command is detected.

9. The operating method of claim 7, further comprising:
comparing the separate safety signal, the operation control signal, or the separate safety signal and the operation control signal with at least one operating variable of the respective bypass circuit; and
issuing a deactivation command when a discrepancy is detected between the at least one operating variable and the separate safety signal, the operation control signal, or the separate safety signal and the operation control signal.

10. The operating method of claim 9, further comprising ascertaining a feedback signal from the at least one operating variable of the respective bypass circuit in a feedback unit.

11. The operating method of claim 10, further comprising generating, by the feedback unit, a mirror signal corresponding to the feedback signal and issuing the mirror signal to the controller.

12. A switching system for connecting at least one main circuit that is connected to an electric motor, the switching system comprising:
a safety switching device;
an electromechanical switching device; and
a soft starter for connecting the at least one main circuit, each main circuit of the at least one main circuit including a bypass circuit having a semiconductor switch, the soft starter comprising:
a controller configured to actuate the respective bypass circuit, the controller comprising:
a control signal input configured to receive operation control signals; and
a separate safety-signal input configured to receive safety signals.

13. The switching system of claim 12, wherein a command output of the safety switching device is connected to an operation control instrument and a safety-signal input of the controller of the soft starter.

14. In a non-transitory computer-readable storage medium that stores instructions executable by a controller of a soft starter to operate an electric motor by the soft starter, the soft starter comprising a controller and being connected to at least one circuit comprising a bypass circuit having a semiconductor switch, the instructions comprising:
continuously operating the electric motor;
receiving an operation control signal via a control signal input of the controller;
receiving a safety signal via a separate safety input of the controller;
checking the operation control signal and the separate safety signal; and
issuing a deactivation command to the respective bypass circuit when it is detected in the checking that the separate safety signal, the operation control signal, or the separate safety signal and the operation control signal command an operation stop.

* * * * *